United States Patent [19]

Lister et al.

[11] Patent Number: 5,966,540
[45] Date of Patent: *Oct. 12, 1999

[54] HOSTED MACHINE CODE INSTALLATION

[75] Inventors: Martin Edward Lister; Simon Phipps; Noel Rooney, all of Hampshire, United Kingdom

[73] Assignee: International Business Machines Corp., Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/899,366

[22] Filed: Jul. 23, 1997

[30] Foreign Application Priority Data

Feb. 6, 1997 [GB] United Kingdom .................... 9702448

[51] Int. Cl.⁶ ........................................................ G06F 9/445
[52] U.S. Cl. ............................................................. 395/712
[58] Field of Search .................................. 395/703, 712, 395/348, 705; 380/49

[56] References Cited

U.S. PATENT DOCUMENTS

| | | | |
|---|---|---|---|
| 5,179,703 | 1/1993 | Evans | 395/703 |
| 5,265,252 | 11/1993 | Rawson, III et al. | 709/301 |
| 5,432,937 | 7/1995 | Tevanian et al. | 395/700 |
| 5,485,579 | 1/1996 | Hitz et al. | 395/200.51 |
| 5,517,636 | 5/1996 | DeHart et al. | 395/200.7 |
| 5,583,983 | 12/1996 | Schmitter | 395/705 |
| 5,665,501 | 9/1997 | Jones et al. | 430/59 |
| 5,715,463 | 2/1998 | Merkin | 395/712 |
| 5,757,925 | 5/1998 | Faybishenko | 380/49 |
| 5,794,052 | 8/1998 | Harding | 395/712 |

FOREIGN PATENT DOCUMENTS

| | | | |
|---|---|---|---|
| 0398647 | 11/1990 | European Pat. Off. | G06F 9/445 |
| 0592079 | 4/1994 | European Pat. Off. | G06F 9/445 |
| WO91/19244 | 12/1991 | WIPO | G06F 3/00 |

*Primary Examiner*—Tariq R. Hafiz
*Assistant Examiner*—Chameli Chaudhuri Das
*Attorney, Agent, or Firm*—A. Bruce Clay

[57] ABSTRACT

There is described a method and system for installing a JAVA application on to a computer system. The method comprises the steps of: determining the particular operating system of the computer system; selecting installation commands (such as editing registry files, creating program groups and folders) corresponding to the determined operating system from a plurality of operating system dependent installation commands; and executing the selected installation commands corresponding to the particular operating system to fully integrate the application onto the operating system.

20 Claims, 4 Drawing Sheets

HOSTED MACHINE CODE INSTALLATION

FIELD OF THE INVENTION

This invention relates to hosted machine code installation and in particular to installing hosted machine code applications (such as JAVA applications) which may be executed on different operating systems without recompilation.

As computer applications grow more complex, the number of files associated with the application increases and installation can require large numbers of files to be copied from one location to another. Computer operating systems have also grown more complex, especially those of the Graphical User Interfaces type. During system specific installation several directories need to be updated, folders created, icons created, path definitions changed or editing an operating system register before the application can become fully integrated with the operating system. Previously one would have installed the components manually and changed the operating system variables and directories accordingly.

To aid the user through this complex process installation software has been developed to aids the user in installing an application. The installation software performs routine tasks such as loading the individual components and the user is only asked for non-standard information. This installation software can allow the setup of complex applications onto a particular operating system on a single request. Examples of such installation software are INSTALLSHIELD and OS/2 SOFTWARE INSTALLER. INSTALLSHIELD and OS/2 SOFTWARE INSTALLER are trademarks of STIRLING TECHNOLOGIES, INC. and IBM CORPORATION respectively.

Disadvantages of the above installation software are that the application must be written for a particular operating system before it can be installed and the installation program must be written for the same operating system. For example INSTALLSHIELD may not be used for OS/2 operating system applications and SOFTWARE INSTALLER may not be used for MS WINDOWS operating system applications. This is because each operating system has platform specific installation procedures, including adding programs to registries, creating program groups and folders and desktop installation. Currently each platform must have its own installation manager or program. WINDOWS 95 and OS/2 are trademarks of MICROSOFT CORPORATION and IBM CORPORATION respectively.

Hosted machine code such as JAVA byte code provides operating system/platform independence of applications. JAVA byte code is a programmable code that is executable on any JAVA enabled platform (an operating system having a JAVA executable environment or virtual machine) without recompilation. However, although JAVA byte code is platform independent on any JAVA enabled platform, installation of the software would still require platform specific installation procedures. This means that although the code to be installed is platform independent, the code that performs the installation must be platform specific. This causes a problem for software distribution as program code that can be run on many platforms must be packaged differently for each operating system. JAVA is a trademark of SUN MICROSYSTEMS CORPORATION.

BACKGROUND OF THE INVENTION

One solution for the installation of long and multiple files has been to supply the program code in a universal format such as the ZIP package. However, this does NOT perform a true install and leaves the user with the problem of integrating the code into the operating system.

CASTENET from MARIMBA (http://www.marimba.com) consists of a platform specific application manager on a computer that downloads and installs client/server JAVA based code from transmitter sites on the Internet. This code is platform independent but usable only within a CASTENET environment. CASTENET then executes the client/server code in the CASTENET environment. Without CASTENET, the user has to establish a connection with the server and download the client/server code each time, the downloading can take several hours depending on the size of the application. CASTENET integrates the code only within the CASTENET environment and not within the user's operating system. A review of this system is given in WIRED (UK) November 1996.

Another installation solution is described on http://www.sbtech.org/jinstall.html and is concerned with extraction and convenient upgrading of JAVA archives on different platforms. However, this does not answer many of the needs of installing and in particular those related to the host platform.

SUMMARY OF THE INVENTION

According to one aspect of the invention there is provided a method for installing a hosted machine code application on to a computer system running an arbitrary operating system comprising the steps of: providing, for at least one operating system installation function, operating system dependent installation commands for a plurality of operating systems; determining the operating system; performing at least one installation function using the operating system dependent installation command of the detected operating system.

According to a second aspect of the invention there is provided a system for installing a hosted machine code application on an arbitrary operating system running on a computer, the system comprising: means for determining the operating system used by the computer; a set of operating system dependent installation commands having a common operating system installation function and each for a different operating system; and means for selecting from the set a command corresponding to the determined operating system; whereby said computer can execute said selected command and perform an operating system installation function on the application.

According to a third aspect of the invention there is provided a storage medium for storing a hosted machine code application for installation on to an operating system running on a computer, the storage medium comprising: the hosted machine code application; an installation tool associated with the application, the tool comprising; means for determining the operating system on the computer; a plurality of operating system dependent installation commands for a plurality of operating systems; means for selecting an installation command corresponding to the determined operating system; and means for enabling said computer to execute said selected command and perform an operating system installation function on the application.

Preferably the system for installing further comprises a plurality of sets, each set corresponding to a different installation function, and whereby the means for selecting is adapted to be instructed to select from one set corresponding to an instructed installation function.

More preferably the system for installing further comprises a means for instructing a sequence of installation functions to the means for selecting.

Advantageously all of the components of the system are incorporated within a single installation tool.

More advantageously all of the components of the system except the sets are incorporated with a single installation tool, the sets are incorporated within the hosted machine code interpreter.

Most advantageously the installation tool and the application are integrated together in a single file.

Preferably the installation tool comprises instructions in the hosted machine code language.

Advantageously some of the plurality of sets comprise operating system uninstall commands for removing the application from the operating system.

A packaged JAVA application may be advantageously installed on any operating system. The install routine is preferably written in the same code as the application code (JAVA byte code for example) which can be interpreted by all the different operating systems. For each of these platforms there is a platform specific piece of code that performs the installation operations which cannot be performed in the hosted machine code format. The installation manager detects the hosting operating system and installs the application fully into it. The installation file can be supplied as a single packed file which is capable of being unpacked into its individual components and installed on any hosting operating system. The installation manager may also install an uninstallation manager which is also written in the hosted machine code format and which can be used to remove the application at a later date.

Hosted machine code is a platform independent code such as the byte code needed for the JAVA Virtual Machine.

The invention may also be used with Internet and intranet software installs where the server machine does not know the operating system of the client (target) machine. Furthermore, the invention is not limited to determining the operating system and may determine the version of the operating system and if any software patches are being used.

An operating system installation function is a generic name for a particular function performed within most operating systems. Such a function may be to integrate an application into the user's operating environment, by adding folders and icons, updating configuration files, adding environment variables, etc.

An operating system dependent installation command is a particular instruction or sub routine call for a particular operating system in order to carry out an operating system installation function. A 'set' of commands as used in describing the invention means a collection or group of instructions typically stored together so that one of the commands can be selected and retrieved (as in a database). The 'set' may be grouped by function or operating system or any other way which is practicable.

'Installation tool' refers to the JAVA Installer.

'Component' refers to a part, means, set, programme routine or subroutine of the JAVA Installer and/or the application.

The JAVA Installer and the application code can be distributed by conventional methods including physical media but may also be distributed over the Internet and the intranet. A benefit of this is that it will promote a standard install and distribution process across the software industry. A further benefit is that it can be used to install any type of application (not just those written in the hosted machine code), as long as the hosting OS is capable of executing the JAVA Installer.

In order to promote a fuller understanding of the above and other aspects of the invention, an embodiment will now be described, by way of example only, with reference to the accompanying drawings in which:

DETAILED DESCRIPTION OF THE PREFERRED EMBODIMENTS

Figure 1A:
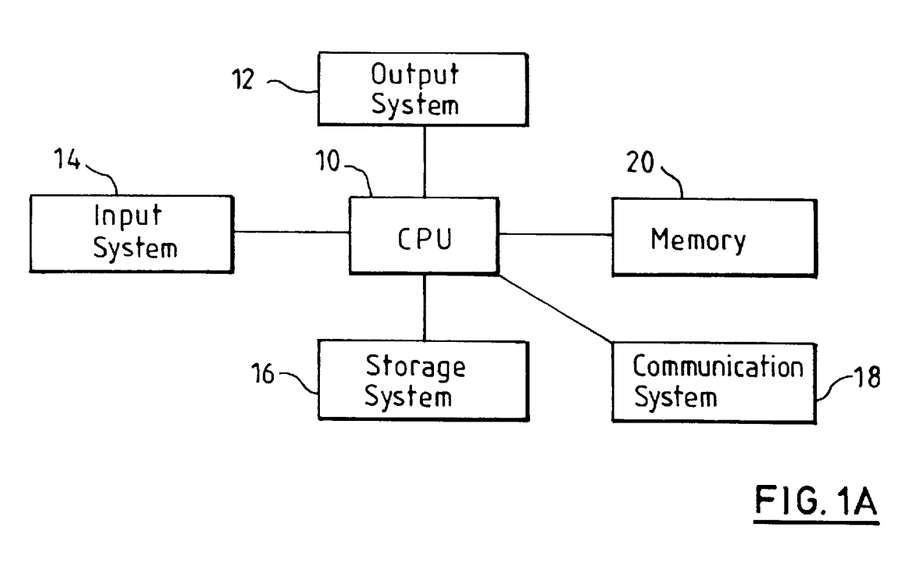
FIG. 1A is a schematic of a hardware environment in which the present invention may be practised.

A typical hardware environment in which the present invention may be performed comprises a central processing unit (10) (CPU) having an output system (12), input system (14), storage system (16), communication system (18) and memory (20) connected thereto (FIG. 1A). The output system (12) will normally comprise a visual display unit (VDU) or monitor and a printer and the input system (14) will normally comprise a keyboard and mouse unit (not shown). The storage system (16) will typically comprise a magnetic disk drive and a CD-ROM disk drive and the memory (20) will typically comprise a cache memory, system memory, display memory. The communication system (18) provides for connection to a network of other computer via a LAN, WAN or the Internet using a modem or a direct connection.

Figure 1B:
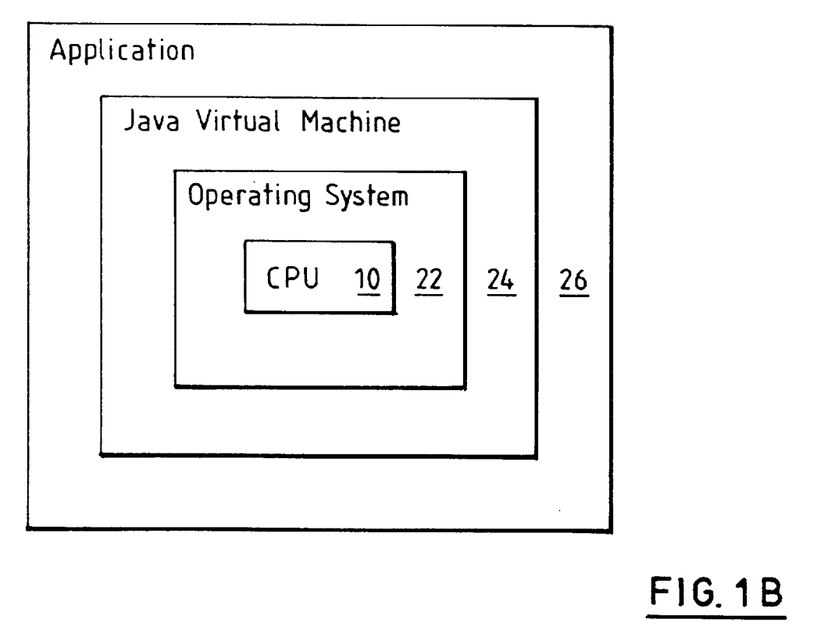
FIG. 1B is a schematic of the system layers of the present invention.

A typical system environment in which the present invention may be performed comprises a CPU (10) having an operating system layer (22), a JAVA Virtual Machine (24) and then an application (26) (FIG. 1B). The CPU processes machine code instructions at the lowest level of processing. Normally on start up the CPU (10) will process instructions to load operating system code from the storage system (16) into the memory (20). The operating system comprises the machine code language of the CPU (10), it interprets a higher level code specific to the operating system, and instructs the CPU (10) in machine code. WINDOWS 95 and OS/2 are examples of operating systems. A JAVA Virtual Machine (24), which works above the operating system (22), is loaded from storage into memory. The JAVA virtual machine (24) also comprises the machine code of the CPU (10) and is for interpreting a higher level JAVA code and instructs the particular operating system using operating system commands. The JAVA application (26) is loaded from storage (16) or from a remote computer on a network (such as the Internet) connected to CPU (10) by the communications system (18). The JAVA application (26) will take instructions from a user, typically in the form of high level instructions through the keyboard or by mouse interaction. A JAVA application will pass these instructions to the JAVA Virtual Machine for processing the JAVA Virtual Machine will pass on the instructions, in a lower level format to the operating system which will instruct the CPU (10) in the machine code any output from the processing will typically be displayed on the monitor.

Figure 2A:
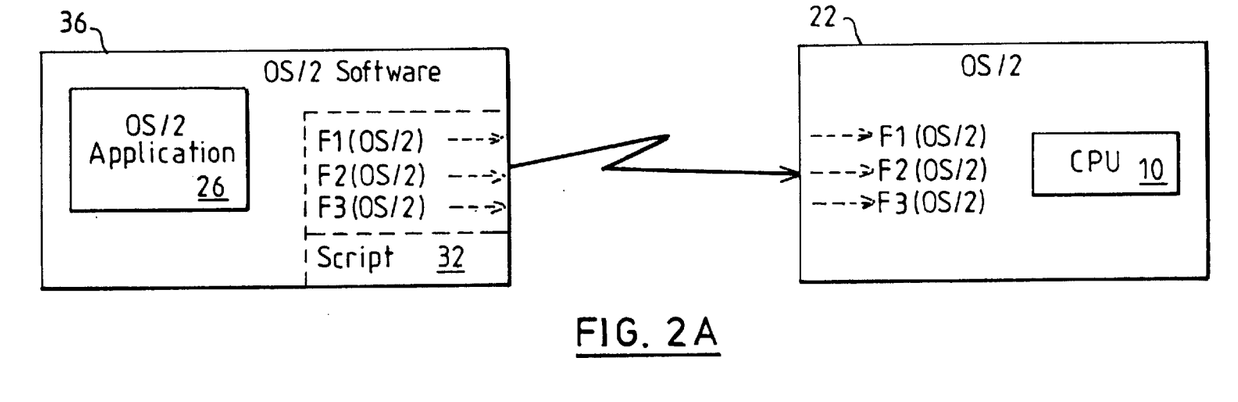
FIG. 2A is a schematic of a first prior art installation system.
Figure 2B:
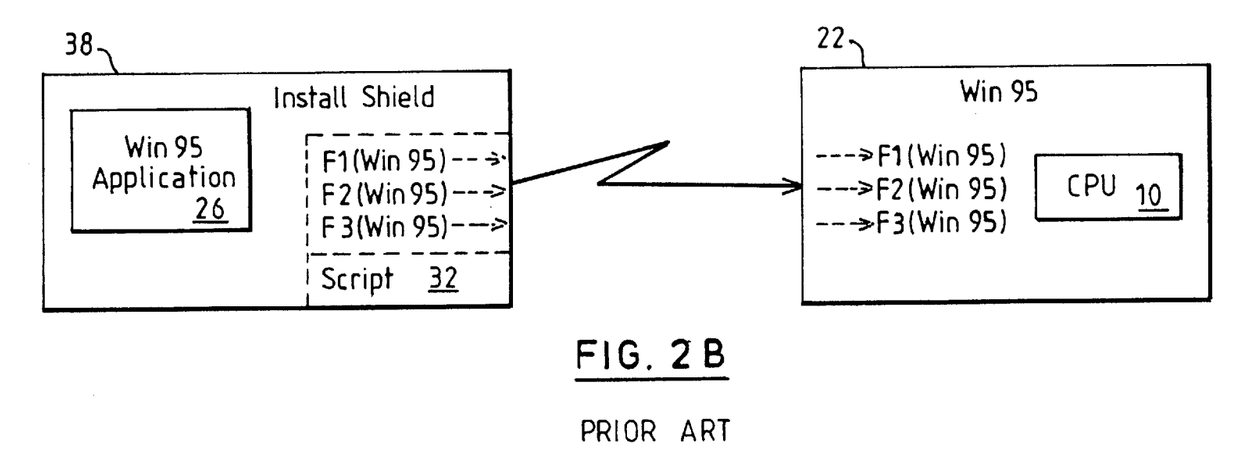
FIG. 2B is a schematic of a second prior art installation system.

Installation software is generally restricted to specific operating systems (10) (FIG. 2A & 2B). For instance an application (26) written to run on IBM's OS/2 requires the OS/2 Software Installer (36) to install it on a IBM PC having OS/2 operating system (10). To install an OS/2 application (26), the installer (36) will need to make calls on platform specific installation procedures (Rexx calls), for example, editing an operating system register (F1[OS/2]), creating program groups and folders (F2[OS/2]), and desktop installation (F3[OS/2]). The installation software (36) needs to make these specific calls to the procedures in the OS/2 operating system. Typically the user will have the OS/2 application on disk and install from that disk, the installation software will load an install script (32) and process each of the script commands in turn, making the specific calls to the OS/2 procedures so that the software is installed as required.

Likewise, an application written to run on Microsoft's Windows 95 would require Install Shield (38) to install it on an IBM PC having Windows 95 operating system. To install a Windows 95 application (26), the installer (38) will need to make calls on platform specific installation procedures (Windows API calls), for example, editing an operating system register (F1[Win95]), creating program groups and folders (F2[Win95]), and desktop installation (F3[Win95]) (FIG. 2B). Typically the user will have the Windows 95 application on disk and install from that disk, the installation software (38) will load an install script (32) and process each of the script commands in turn, making the specific calls to the Active X, for example, procedures so that the software is installed as required.

The problem of writing applications for many operating systems is addressed by JAVA. JAVA started as a programming language, created by Sun's James Gosling to provide a simpler, less error-prone programming environment than C or C++. The initial project intended for JAVA required the binary code produced by the language to run on any one of a range of otherwise incompatible computer systems. Consequently, a virtual machine environment was created as equivalent software microchip, that could be implemented on all the computer systems. Now JAVA has developed into a platform independent runtime environment. JAVA "byte-code binary" programs for this environment can be created using languages such as IBM's NetREXX a new programming language derived from IBM's REXX and JAVA as well as with the JAVA language itself.

Figure 3:
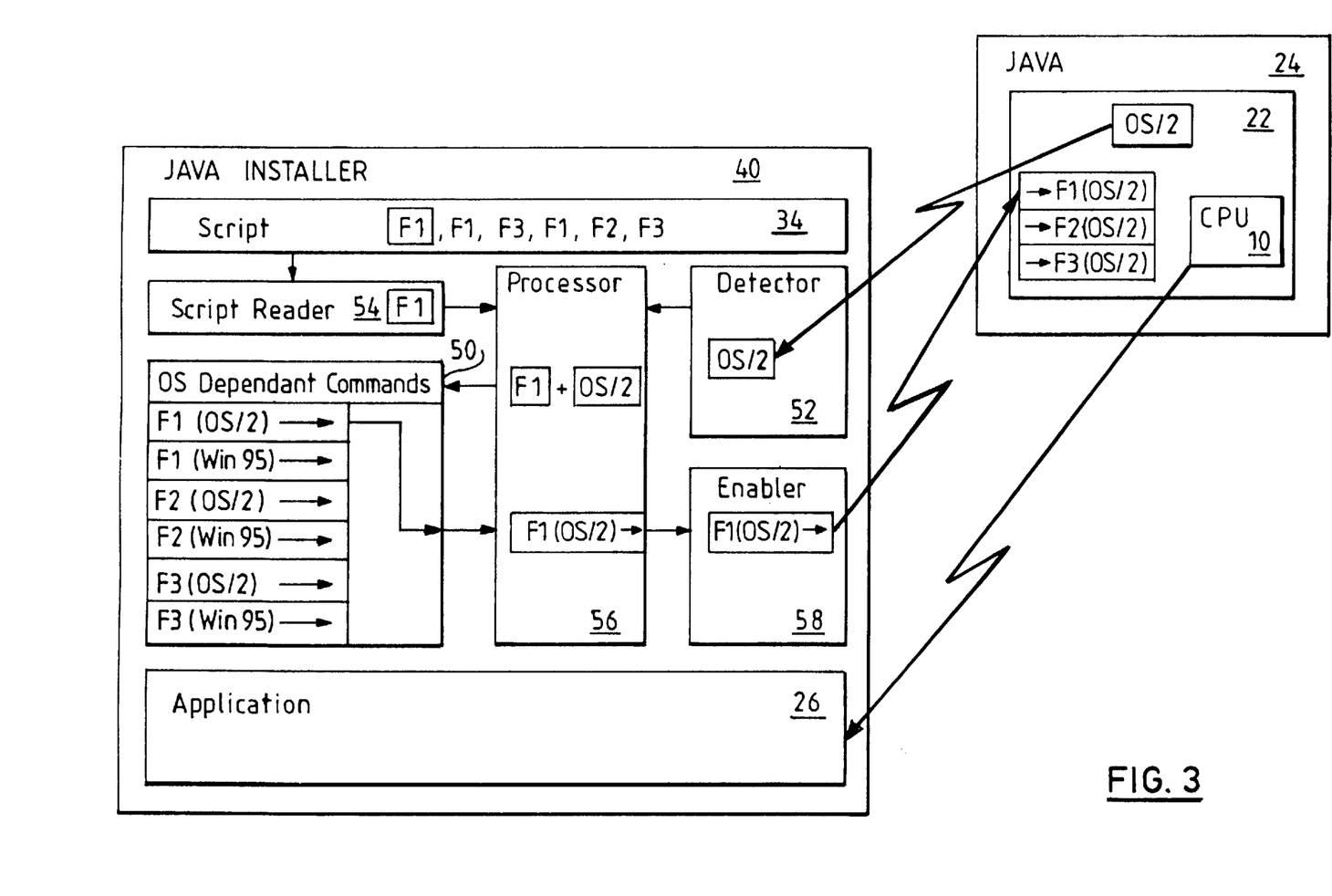
FIG. 3 is a block diagram of the installation system of the present invention.

The present embodiment of the invention uses install software (40) (the JAVA Installer) comprising the same machine code as the application code (JAVA in this example) which can be interpreted by a JAVA enable operating system (24) (the JAVA virtual machine) (FIG. 3). The data may also be grouped by operating system rather than command function.

The JAVA Installer (40) has a data component (50) having several groups of instructions or commands (F1[OS/2] and F1(Win95), (F2[OS/2] and F2(Win95]), (F3[OS/2] and F3[Win95]). Each group contains equivalent commands for one operating system install function, each command corresponding to the different operating systems. In this case there are two commands for each function, one for OS/2 and one for Windows. Such procedures would include editing an operating system register (F1), creating program groups and folders (F2), and desktop installation (F3). JAVA Installer (40) includes a detector component (F2) which detects which operating system (22) is running on the CPU (10), in this embodiment the detector (52) is a call to a JAVA routine which determines operating system. Such a routine is included in the JAVA Virtual Machine (24) for most platforms and when called, returns the name of the operating system (10) being used. The JAVA Installer also includes a script reader component (54) and an install script (34). The install script (34) contains general installation commands corresponding to the specific installation function such as F1, F2 or F3. The script shown in FIG. 3 is a sequence of functions (F1, F1, F3, F1, F2, F3).

The JAVA Installer (40) also comprises a processor component (56) connected to the detector component (52), the script reader (54) and the data component (50). The JAVA Installer further comprises an enabler component (58) connected to the processor and for communicating an install function to the JAVA virtual machine (24).

A typical system for execution of the JAVA Installer may be a JAVA Virtual Machine running on an OS/2 operating system on top of a 486 microprocessor based personal computer. A user in the JAVA Virtual Machine environment loads a disk or CD containing both the JAVA Installer and the application and executes an executable file typically labelled 'setup.class'. The setup file contains both the JAVA Installer and the application in a compressed format. On execution the two files are uncompressed, separated and saved on the hard drive and the JAVA Installer initiated. Alternatively the setup file contains the installer and application as separate uncompressed files.

On initiation of the JAVA Installer (40), the detector (52) determines which operating system (22) is running on the CPU (10) and passes the result (in this case OS/2) to the processor component (56). The script reader (54) reads the first function from the Install script (34) (in this case F1—edit register) and passes it on the processor component (56). The processor component (56) uses the results passed to it from the script reader (54) and the detector (52) and selects from the data component (50) the associated operating system dependent command (F1(OS/2)→) which it passes on to the enabling component (58). The enabling component (58) passes the operating system dependent command to the JAVA Virtual Machine which passes it on to the operating system (22). The operating system install routine (→F1(OS/2) in the operating system (22) is then initiated to edit an operating system register.

A similar procedure is adopted for following and subsequent functions in the install script (34) until all the install functions have been processed and the various install functions such as opening folders, creating program groups and editing registers have been performed by the operating system (22) on the application (26).

Figure 4:
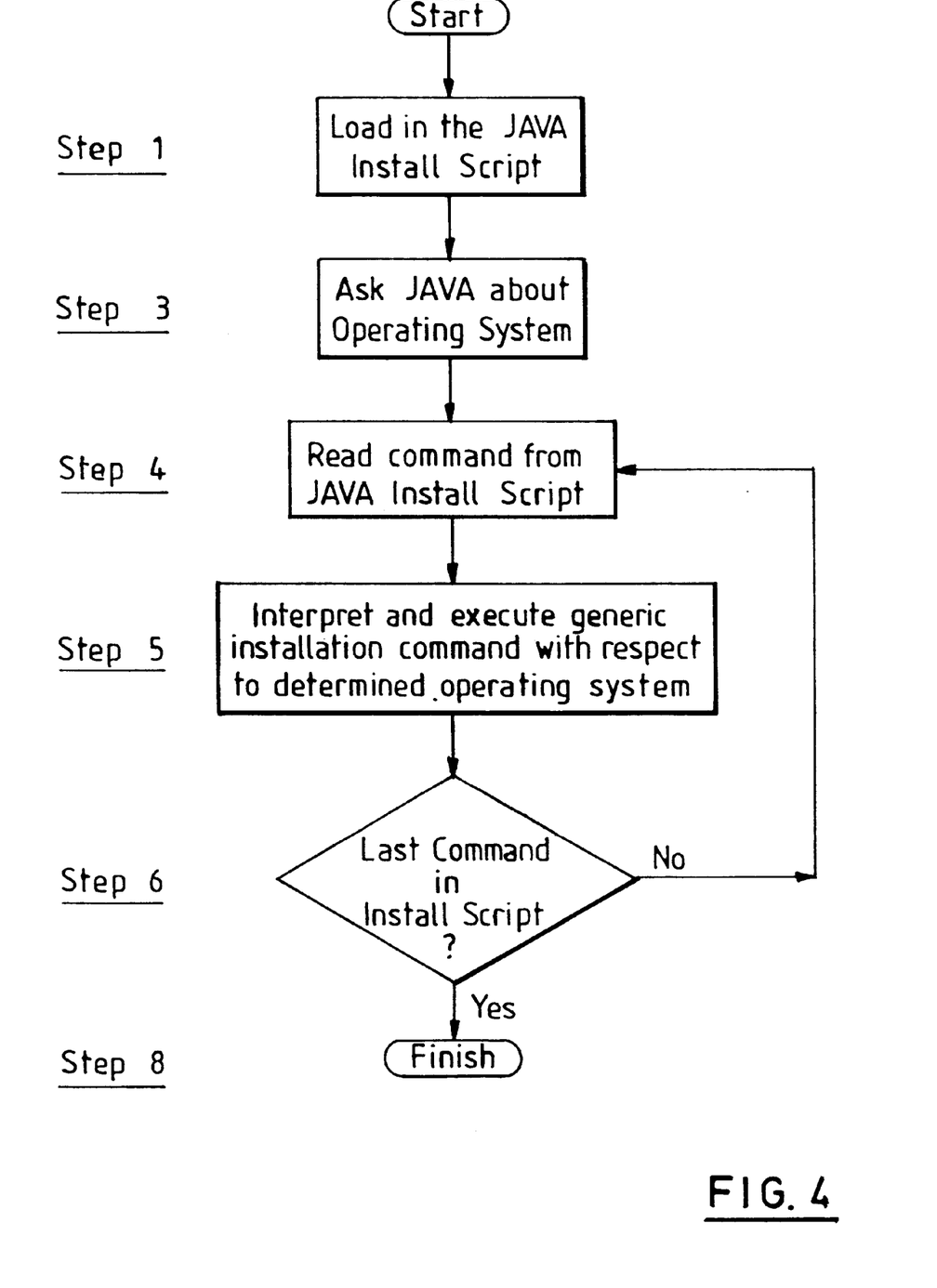
FIG. 4 is a flow diagram of the process of the present invention.

The method of the present embodiment is set out as a series of eight steps written in pseudo program code below. [The program code would normally be performed by the JAVA virtual machine]. (FIG. 4 shows the flow of the process in diagrammatic form).

```
class Jinst
{
// List of Known Operating System Identification
strings (JAVA property)
static final String[] OSList = { "NONE", "OS/2",
"AIX", "OS/400" .... etc } ;
    // JAVA install manager constructor
    Jinst (String [] args)
    {
    /* Initialisation section */
        // STEP 1 - Read in the JAVA install
        script (34)
        // STEP 2 - Read in the response file if
        in operating in Batch mode (no GUI) (Non
        graphical systems such as OS/400 may need
        to run in batch mode. If user input is
```

-continued

```
              required during install it can be
              predefined here. This is also needed
              for unattended installation).
              // STEP 3 - Ask JAVA which operating
              system we are running on and set our OS
              variable for making decisions during
              install (JAVA returns OS in the form
              "OS/2", "AIX" etc...)
         /* Now Perform the install by following the
         install script */
              // STEP 4 - Read a line from JAVA install
              script (if finished GOTO STEP 7)
              // STEP 5 - Interpret the generic
              installation command EG : CreateIcon(),
              CreateFolder(), CopyFile(),
              ConfigUpdate(), etc..
                   -   Call appropriate platform
                       specific installation procedure
                       for determined operating system.
                       These are JAVA methods
                       which link to native operating
                       system code where necessary.
                       This native code is supplied
                       with the JAVA installer and
                       shipped with the product to be
                       installed. This enables a
                       single package to be installed
                       on multiple operating systems.
                   -   Get user input if required (or
                       use response file)
              // STEP 6 - GOTO STEP 4
              // STEP 7 - Copy JAVA installer to target
                   system to allow later removal of
                   installed product (possibly via
                   an uninstall script).
         /*Install finished
              // STEP 8 - Exit Installation
         }
    }
}
```

An example of the use of the invention in the field of JAVA Technology is a product developed as a large JAVA application, for example a large office suite. Since it is written purely in JAVA it has the possibility of running on any JAVA-enabled platform (such as Windows platforms, OS/2, AIX, OS/390, Solaris, etc). Currently this must be shipped with a different install for each operating system. There is the option of having no install but instead forcing the user to setup paths, create icon associations, etc. This is not feasible for a complex installation application. It also does not allow for easy maintenance and uninstalls. Users expect a certain level of integration with their operating system. Using the submitted solution the product would be packaged up with the JAVA installer and a generic install script to perform the necessary installation procedures.

At install time JAVA installer, which can be run on any hosting operating system, detects this hosting operating system and reads the install script, mapping the commands to the host operating system's relevant API calls or commands (these may be written in native code or in JAVA if possible). Here are some OS specific examples:

OS/400
JAVA installer would call the OS/400 installation APIs either directly or via CL and install the code in a library. If necessary it can be registered as a Licensed Program.

OS/2
JAVA installer would make Rexx calls to create folders and icons. It would update The CONFIG.SYS and register itself in the OS2. INI file if required.

MS Windows (3.X, 95 and NT)
JAVA installer would use native code to create folders, icons and update the Windows Registry.

An uninstall application, also written in JAVA, would be installed so that the application can be fully removed at a later date.

The result is an installed product which looks to the user identical to a fully integrated native product. The benefit to the product owner is that they can ship a single file or media package which is installable on all platforms.

In summary there is described a method and system for installing a JAVA application on to a computer system. The method comprises the steps of: determining the particular operating system of the computer system; selecting installation commands (such as editing registry files, creating program groups and folders) corresponding to the determined operating system from a plurality of operating system dependent installation commands; and executing the selected installation commands corresponding to the particular operating system to fully integrate the application onto the operating system.

We claim:

1. A method for installing a hosted machine code application on to a computer system having an arbitrary operating system comprising the steps of:
    providing, for at least one operating system installation function, operating system dependent installation commands for a plurality of operating systems;
    providing an operating system independent script which installs the hosted machine code application on to the computer system wherein installation commands in the operating system independent script are the same irrespective of the operating system of the computer system and wherein the operating system independent script includes an installation command corresponding to the at least one operating system installation function;
    determining the operating system;
    selecting, responsive to execution of the operating system independent script, an operating system dependent installation command from the operating system dependent installation commands for the plurality of operating systems to perform the at least one installation function based on the determined operating system;
    performing the at least one installation function using the selected operating system dependent installation command; and
    enabling the computer to execute the selected installation command and perform an operating system installation function on the application.

2. A system for installing a hosted machine code application on an arbitrary operating system running on a computer, the system comprising:
    means for determining the operating system used by the computer;
    a set of operating system dependent installation commands corresponding to an operating system installation function, wherein each of the operating system dependent installation commands in the set of operating system dependent installation commands corresponds to a different operating system;
    an operating system independent script which installs the hosted machine code application on to the computer system wherein installation commands in the operating system independent script are the same irrespective of the operating system of the computer system and wherein the operating system independent script includes an installation command corresponding to the at least one operating system installation function;

means for selecting from the set of operating system dependent installation commands an operating system dependent installation command corresponding to the determined operating system; and means, responsive to the operating system independent script, for executing said selected operating system dependent installation command so as to perform an operating system installation function on the application.

3. A system according to claim 2 further comprising a plurality of sets, each set corresponding to a different operating system installation function, and whereby the means for selecting is adapted to be instructed to select from one set corresponding to an instructed installation function.

4. A system according to claim 3 further comprising a means for instructing a sequence of installation functions to the means for selecting.

5. A system according to claim 4 wherein all the components of the system are incorporated within a single application tool.

6. A system according to claim 4 wherein all the components of the system except the sets are incorporated within a single installation tool and the sets are incorporated into the hosted machine code interpreter or the operating system environment.

7. A system according to claim 6 wherein the installation tool and the application are integrated together in a single file.

8. A system according to claim 7 wherein the installation tool comprises the same code as the hosted machine code.

9. A system according to claim 8 wherein some of the plurality of sets comprise operating system uninstall commands for removing the application from the operating system.

10. A system as claimed in claim 9 wherein the computer comprises a hosted machine environment.

11. A system as claimed in claim 10 wherein said hosted machine environment is a JAVA virtual machine.

12. A system as claimed in claim 11 wherein the hosted machine code is JAVA.

13. A system according to claim 4 wherein said sequence of installation functions comprises generic install commands and each generic install command corresponds to a common function performed within more than one operating system.

14. A storage medium for storing a hosted machine code application for installation on to an operating system running on a computer, the storage medium comprising:

the hosted machine code application;

an operating system independent script which installs the hosted machine code application on to the computer system wherein installation commands in the operating system independent script are the same irrespective of the operating system of the computer system and wherein the operating system independent script includes an installation command corresponding to the at least one operating system installation function;

an installation tool associated with the application, the tool comprising:

means for determining the operating system on the computer;

a plurality of operating system dependent installation commands for a plurality of operating systems;

means, responsive to the operating system independent script, for selecting an operating system dependent installation command corresponding to the determined operating system; and means for enabling said computer to execute said selected command and perform an operating system installation function on the application.

15. A method of installing a software application on a computer system, the method comprising the steps of:

executing a platform independent installer program on the computer system;

determining an operating system associated with the computer system;

providing generic installation commands from a platform independent installation script to the installer program, wherein the generic installation commands are the same for installation of the software application irrespective of the platform on which the software application is being installed; and wherein the platform independent installer program carries out the following steps in response to receiving a generic installation command:

interpreting the generic installation command based on the determined operating system associated with the computer system so as to provide operating system specific commands associated with the generic installation command; and executing the operating system specific commands associated with the generic installation command.

16. A method according to claim 15, wherein the platform independent installer program is a JAVA installer program.

17. A system for installing a software application on a computer system, comprising:

means for executing a platform independent installer program on the computer system;

means for determining an operating system associated with the computer system;

means for providing generic installation commands from a platform independent installation script to the installer program, wherein the generic installation commands are the same for installation of the software application irrespective of the platform on which the software application is being installed; and wherein the platform independent installer program further comprises:

means for interpreting the generic installation command based on the determined operating system associated with the computer system so as to provide operating system specific commands associated with the generic installation command; and means for executing the operating system specific commands associated with the generic installation command.

18. A system according to claim 17, wherein the platform independent installer program is a JAVA installer program.

19. A computer program product for installing a software application on a computer system, comprising:

a computer readable storage medium having computer readable program code means embodied in said medium, said computer readable code means comprising:

computer readable code means for executing a platform independent installer program on the computer system;

computer readable code means for determining an operating system associated with the computer system;

computer readable code means for providing generic installation commands from a platform independent installation script to the installer program, wherein the generic installation commands are the same for installation of the software application irrespective of the platform on which the software application is being installed; and wherein the platform independent installer program further comprises:

computer readable code means for interpreting the generic installation command based on the determined operating system associated with the computer system so as to provide operating system specific commands associated with the generic installation command; and     computer readable code means for executing the operating system specific commands associated with the generic installation command.

20. A computer program product according to claim 19, wherein the platform independent installer program is a JAVA installer program.

* * * * *